(No Model.) 2 Sheets—Sheet 1.
G. GRISEL.
MOQUETTE GUIDE FOR CARPET SEWING MACHINES.
No. 333,125. Patented Dec. 29, 1885.
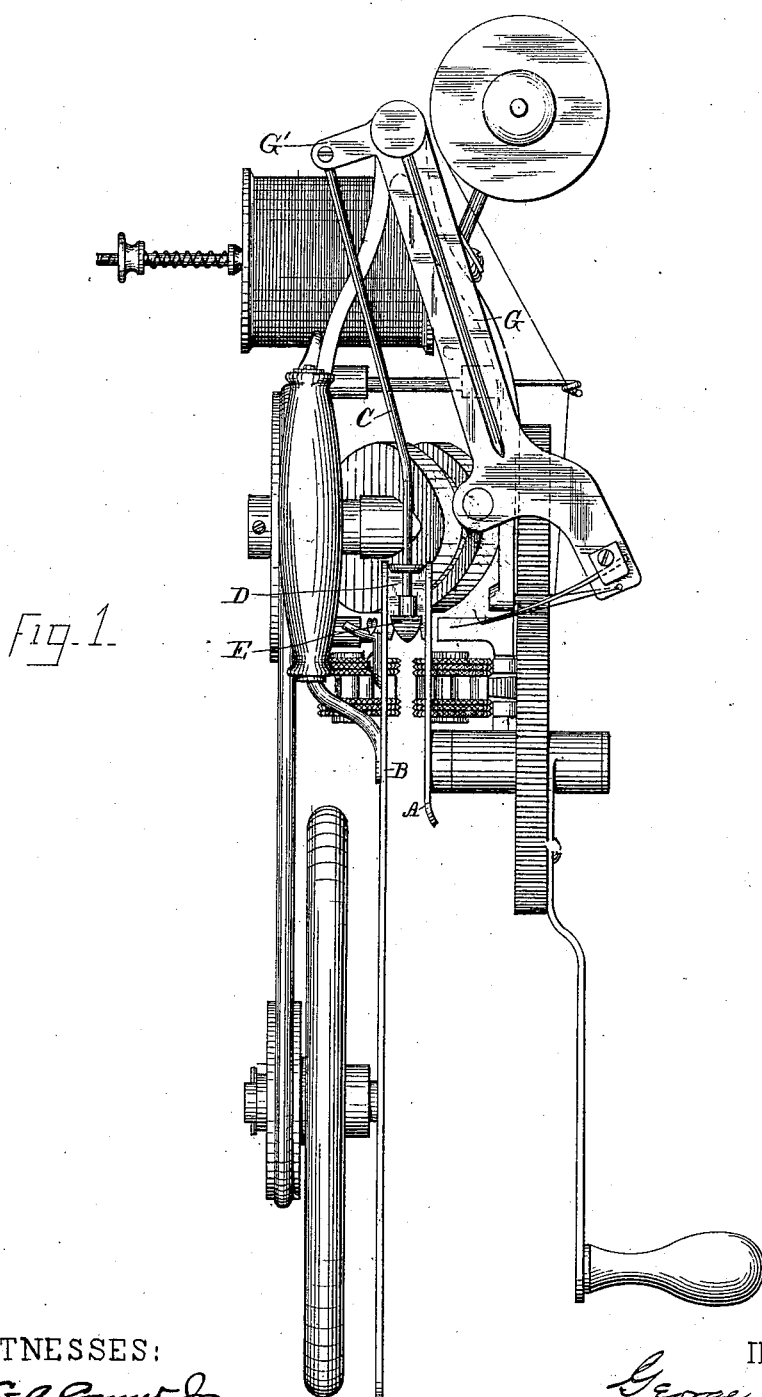

(No Model.) 2 Sheets—Sheet 2.
G. GRISEL.
MOQUETTE GUIDE FOR CARPET SEWING MACHINES.
No. 333,125. Patented Dec. 29, 1885.
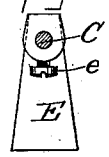
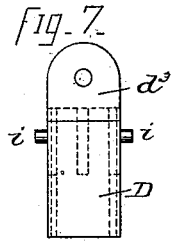
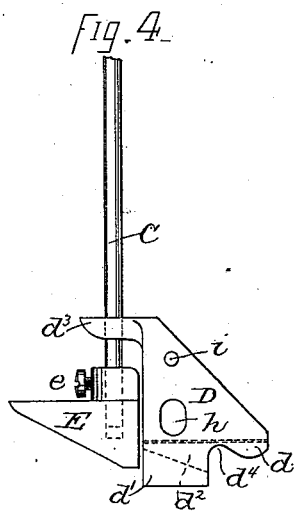
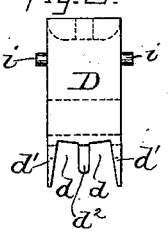
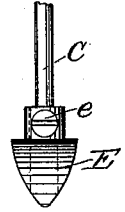
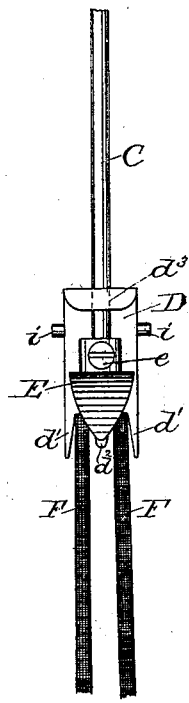
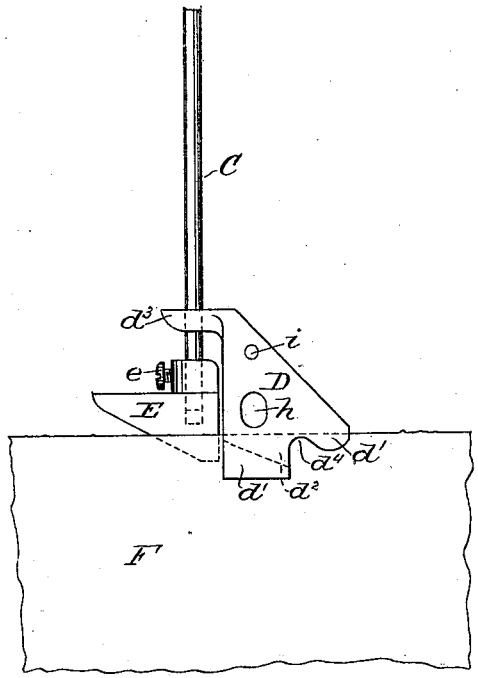
WITNESSES: INVENTOR:

UNITED STATES PATENT OFFICE.

GEORGE GRISEL, OF NEW YORK, N. Y., ASSIGNOR TO THE SINGER MANUFACTURING COMPANY OF NEW JERSEY.

MOQUETTE-GUIDE FOR CARPET-SEWING MACHINES.

SPECIFICATION forming part of Letters Patent No. 333,125, dated December 29, 1885.

Application filed June 23, 1885. Serial No. 169,552. (No model.)

*To all whom it may concern:*

Be it known that I, GEORGE GRISEL, a citizen of France, residing at New York, in the county of New York and State of New York, have invented certain new and useful Improvements in Moquette-Guides for Carpet-Sewing Machines, of which the following is a specification, reference being had therein to the accompanying drawings.

My invention relates to certain improvements to be used with the carpet-sewing machine covered by my Patent No. 296,744, dated April 15, 1884, the object of my present invention being to provide certain improved devices for controlling the edges of the fabrics being sewed when the machine is working on "moquette" or other similar carpets having a long pile, which is apt to interfere with the sewing.

In carrying my invention into effect I construct a turning-in guide, somewhat similar to that shown in my above-named patent, but having the outer flanges on the lower side thereof, which form the guiding-recesses for the edges of the carpets, extended rearward of the transverse recess forming the needle-passage.

In place of the separating horn or blade on the turning-in guide shown by said patent, I use a wedge-shaped reciprocating "piler" or pile-deflector, which is adjustably attached to a rod passing upward through a steadying-lug on the turning-in guide, and connected with some moving part of the machine, as an extension from the hub of the needle-arm. The turning-in guide is adjustable relative to the path of the needle, as in my patent referred to, and the piler is adjustable on its supporting-rod independently of the turning-in guide.

In the drawings, Figure 1 is a front view of my machine, showing my improvements in operative positions. Fig. 2 is a detail front view of my pile-deflector and turning-in guide; and Figs. 3 and 4 are side views of the same. Fig. 5 is a detail top view of the pile-deflector, and Fig. 6 a front view thereof. Figs. 7 and 8 are detail plan and rear views, respectively, of the turning-in guide.

D indicates a block, forming the turning-in guide, said block having in its lower face guiding-passages, $d$, formed by flanges $a'$ at the sides thereof, and a central turning-in blade, $d^2$, said flanges being mainly in front of the transverse recess or needle-passage $d^4$, but extending also rearward of said recess. This construction enables the block or guide to rest more firmly on the edges of the fabrics F than the form of guide shown by my patent aforesaid.

A and B indicate the plates between which the block D is secured, said block having, besides the downwardly-projecting inclined turning-in blade $d^2$, a slot, $h$, for the passage of the attaching-screw, and steady-pins, $i$, extending into slots in said plates, as in my prior patent. The block D is also provided at its top with a forwardly-projecting lug, $d^3$, through which passes a rod, C, and to the lower end of the latter is removably and adjustably attached by a set-screw, $e$, the wedge shaped piler or pile-deflector E, having an inclined lower face, as clearly shown in Figs. 3 and 4, and tapering rearwardly and downwardly, as shown in said figures and in Figs. 5 and 6. The rod C passes upward through the lug $d^3$, which serves to steady the same, and is attached at its upper end to some moving part of the machine, so as to be reciprocated thereby. In the present instance I have shown said rod as being attached to an arm, G', extending from the hub of the needle bar or arm G.

When constructed as above described, and attached to the machine as shown, the pile-deflector moves forward with the machine along the edges of the fabrics, as F, which are being sewed, in front of the turning-in guide, and, owing to its construction and reciprocating movement, it pushes the pile of the fabrics downward or inward below or inside of the line of stitches.

As the pile-deflector is adjustable on its supporting-rod C independently of the turning-in guide, it is adapted for use with fabrics having different lengths of pile, the turning-in guide being also adjustable, as in my prior patent, to vary the distance of the line of stitches from the edges of the fabrics.

My invention is particularly adapted for use in sewing moquette and other similar velvet carpets having a long soft pile, and it may therefore very properly be termed a "moquette-guide" for carpet-sewing machines.

Having thus described my invention, I claim as new and desire to secure by Letters Patent—

1. In a carpet-sewing machine, the combination, with a turning-in guide, of a reciprocating piler or pile-deflector tapering rearwardly and downwardly, said pile-deflector being arranged in front of said guide and movable independently thereof in a plane at right angles to the feed, substantially as set forth.

2. In a carpet-sewing machine, the combination, with a turning-in guide, of a reciprocating pile-deflector tapering rearwardly and downwardly, and arranged in front of said guide, said pile-deflector being adjustable independently of said guide, and also movable independently thereof in a plane at right angles to the feed, substantially as set forth.

3. A turning-in guide for carpet-sewing machines, having at its top a forwardly-projecting perforated lug, combined with a rod passing through said lug, means for reciprocating said rod, and a rearwardly and downwardly tapering pile-deflector arranged in front of said guide and adjustably attached to said rod, substantially as set forth.

4. The combination, with the plates A and B, of the turning-in guide D, having a transverse needle-recess, $d^4$, and the flanges $d'$, forward and rearward of said needle-recess, substantially as set forth.

In testimony whereof I affix my signature in presence of two witnesses.

GEORGE GRISEL.

Witnesses:
AUG. M. NOONAN,
WILLIAM L. BODINE.